Patented Dec. 15, 1925.

1,565,869

UNITED STATES PATENT OFFICE.

WALTER ADDISON STRAW, OF WHEATON, ILLINOIS, ASSIGNOR TO WESTERN ELECTRIC COMPANY, INCORPORATED, OF NEW YORK, N. Y., A CORPORATION OF NEW YORK.

ETCHING.

No Drawing. Application filed December 20, 1923. Serial No. 681,823.

*To all whom it may concern:*

Be it known that I, WALTER ADDISON STRAW, a citizen of the United States, residing at Wheaton, in the county of Du Page and State of Illinois, have invented certain new and useful Improvements in Etching, of which the following is a full, clear, concise, and exact description.

This invention refers in general to etching, and in particular to a method for etching glass.

Heretofore the basic idea in etching processes has been to apply acid or other etching agent directly to the surface to be etched. This necessitated the protecting of the surface on which no etching action was desired either by the coating of that surface with an acid resisting material, or the use of some similar method of protection.

There are cases where it is desirable that the entire surface of glass be etched in such a way as to leave a transparent surface, but with the surface broken up sufficiently so as to diffuse light, and not reflect a glare from direct or indirect sunlight, or from artificial light. Glass has been etched to obtain this result by the direct application of hydrofluoric or other acid, or the fumes thereof, and the subsequent immersion of the glass in water or an alkaline bath. Difficulty has been experienced, however, in the use of this method, in that small opaque spots, and sometimes large opaque areas, covering even the entire glass, will appear on the etched surface.

Glass such as described above has a variety of uses and may be used to advantage whenever it is desirable to reduce the glare of reflection to a minimum and still retain transparency.

An object of this invention is to provide a method of etching by the use of two agents, neither one of which alone will produce an etch but which in combination will etch the surface.

Another object is to provide a method for breaking up the smooth surface of a piece of glass, so that that surface will diffuse light and still remain transparent.

The method constituting the invention consists in preparing a solution which will not act alone on the material to be etched, but only in conjunction with another agent, which is mixed in the form of a paste and applied to the surface to be etched, the said surface then being immersed in the first-mentioned solution. The chemical compound resulting from the reaction of the two chemicals causes an etching of the immersed surface.

Where the method is employed to etch glass a bath is prepared from ordinary commercial sulphuric acid. A paste is made from powdered commercial fluorspar, or calcium fluoride, mixed with water. This paste is applied to the glass in the outline sought to be etched, and the plate dipped gently into the sulphuric acid bath. It is left immersed for from ½ hour to 3 hours, depending on the result desired. Good results have been obtained by preparing a bath with fifty pounds of a commercial sulphuric acid. In order to quickly cover the entire glass, a comparatively thin paste is prepared with proportions of one (1) pound of powdered fluorspar, and one-fourth (¼) pint of water. The surface of the glass is then covered with this paste and held motionless to dry until the paste coating takes on a dull appearance. The glass is then gently lowered into the acid bath and allowed to remain motionless for two hours. At the end of that time it is removed and washed in running water or an alkaline solution until all trace of the acid has disappeared. The etched surface is then found to diffuse most of the reflected light. For instance, when such an etched surface is held inside a room between the eye and a window, at an angle below the line of vision between the eye and the window, so that the angle of incidence is drawn between the window and the glass and the angle of reflection is drawn between the glass and the eye, only a suspicion of a patch of light will show on it. An unetched plate of glass under similar conditions will reflect a perfect outline of the window or any source of light.

In the etching of glass with hydrofluoric acid in any form it is believed that the silica and other ingredients of the glass dissolve through the action of the hydrofluoric acid to form their several various salts. These salts apparently having an affinity for the surface of the glass will adhere thereto instead of entering into solution with the hydrofluoric acid, or falling by gravity to the bottom of the acid tank. When any fluorides are used in the form of a paste and then immersed in sulphuric acid, as in the new method above set forth, the salts or other substances resulting from the dissolving of the glass seem to have a tendency to adhere to the fluorides. This seems the correct explanation, inasmuch as when the paste is allowed to dry on the etched surface and then washed off, opaqueness results. Moreover, this opaque character then seems to be permanent, because washing in running water and even alkaline solutions do not seem to affect it.

In the above process instead of fluorspar and sulphuric acid, any acid bath and fluoride or hydrofluoric acid capable of producing an etch may be used. Where it is desirable to use the sulphuric acid bath for more than one group of parts to be etched, it has been found advantageous to add thereto a small amount of fluorspar, calcium-fluoride or other fluorides. A small amount of fluorspar or fluorin salts unites in solution with the sulphuric acid while the etching is in progress, and since it is desirable to have the same set of conditions, or as near as possible, present during the etching of succeeding batches of parts, a small amount of the paste used is added to the pure sulphuric solution before any etching work is started. This insures uniform solutions.

In etching glass by the above process if it is desirable to leave part of the surface unetched to form a name, trade-mark, or the like, the desired design may be worked in wax on the surface with a stencil, or a previously formed wax figure may be employed, and be made to adhere to the glass. The etching process is then carried on as outlined above.

This etching process can be used in etching metals by using a different bath and a different paste. If a rough etched surface is desirable on the metal, the etching paste is allowed to dry after etching. If a smooth surface is required, the surface is washed immediately after the etching operation has been completed.

What is claimed is:

1. A method of etching, which consists in applying an agent directly to the material to be etched, which agent alone will not cause etching, and then immersing the object to be etched into an acid which will not alone cause etching, the mixture of the two agents forming a compound which will cause etching.

2. A method of etching glass, which consists in applying an agent to the glass, and subjecting said glass to the action of another agent, the two agents in combination causing an etching in such a way as to leave the etched surface transparent.

3. A method of etching, which consists in applying a coating of fluorspar to the surface of a piece of glass, and immersing said piece of glass in sulphuric acid in such manner as to leave the etched surface transparent.

4. A method of etching, which consists in coating the surface to be etched with an agent, said agent alone being insufficient to etch the surface on which it is applied, and immersing the surface to be etched into a liquid which alone will not cause etching, the two agents being of such a nature as to unite to form an agent which will dissolve the material on which the etching is desired, to cause an etching on the desired surface.

5. A method of etching, which consists in applying an acid resisting material to a portion of the surface of the article to be etched, coating the surface to be etched with an agent which alone will not affect the surface on which it is applied, immersing the surface to be etched into a liquid, said liquid being insufficient to alone cause etching, the coating and liquid together forming an etching agent which will etch the said surface, removing the article from the liquid, washing the said article, and then removing the acid resisting material.

6. A method of etching glass, which consists in applying acid resisting material to a portion of the surface of the glass, coating the glass with fluorspar, immersing the glass into sulphuric acid, removing the glass from the sulphuric acid, washing the glass, and then removing the acid resisting material.

7. A method for etching glass, which consists in applying to the glass a coating of powdered fluorspar and water, lowering the coated glass into a bath of sulphuric acid into which a small amount of fluorspar has been added, and then removing said glass from the bath.

In witness whereof, I hereunto subscribe my name this 7th day of December A. D., 1923.

WALTER ADDISON STRAW.